Feb. 9, 1926.

A. C. SCOTT

SHIPPING CONTAINER

Filed May 8, 1925

A.C.Scott.

By Arthur H. Sturges,
Attorney

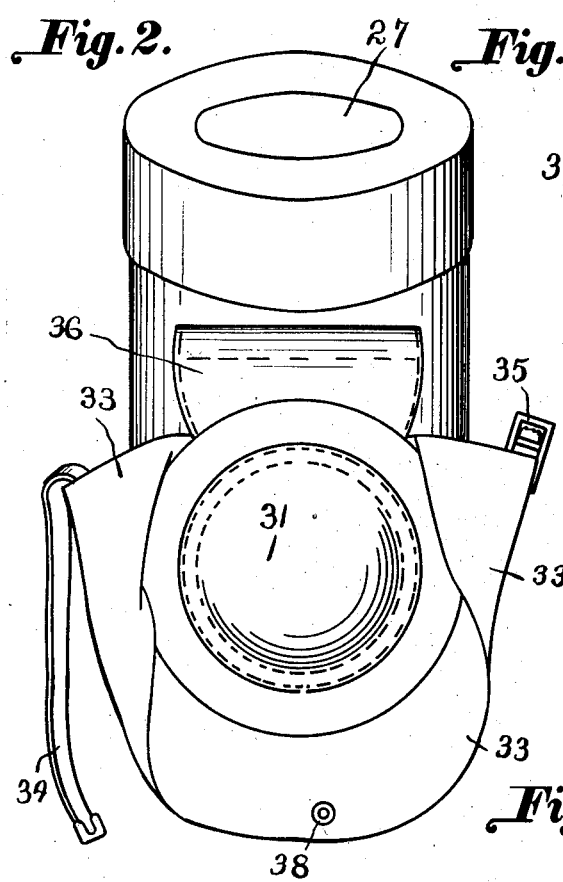
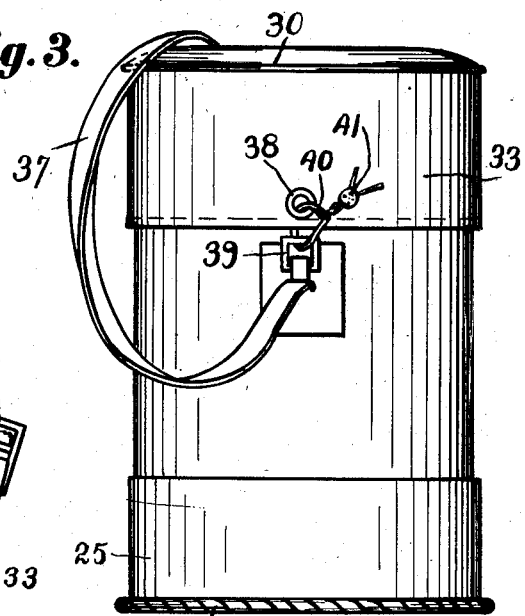
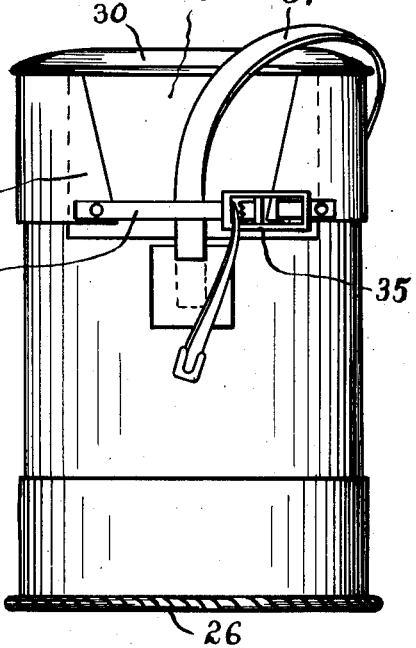
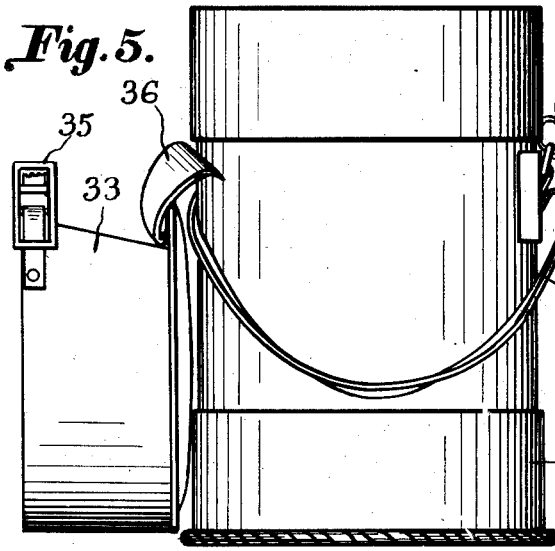

Patented Feb. 9, 1926.

1,572,367

UNITED STATES PATENT OFFICE.

ALLEN C. SCOTT, OF OMAHA, NEBRASKA.

SHIPPING CONTAINER.

Application filed May 8, 1925. Serial No. 28,785.

*To all whom it may concern:*

Be it known that ALLEN C. SCOTT, a citizen of the United States, residing at Omaha, in the county of Douglas and State of Nebraska, has invented certain new and useful Improvements in Shipping Containers, of which the following is a specification.

The present invention relates to shipping containers and particularly to that type adapted for thermatically sealing ice cream and the like for shipment.

An object of the present invention is to provide a container of this character which will seal and protect the contents of the container against temperature changes, so that frozen material or articles may be safely shipped, and will remain intact for long periods of time, such as for upwards of fourteen hours.

Another object of the invention is to provide a container which is constructed particularly for use in shipping quantities of ice cream without the use of ice and salt water, so that the contents of the container is not liable to injury incident to the seepage of salt water into the inner can or compartment, and which will automatically condition the ice cream, so that it may be scooped out or removed from the container after it reaches its destination. In connection with this object it is well known that under present conditions after a can of ice cream is shipped and reaches its destination it frequently is frozen so hard that it cannot be scooped out of the container until it has been exposed for some time, so as to soften the bulk of the ice cream at the top, the cream softening as it is being dished out.

Another object of the invention is to provide a heat insulating container with a flexible cover and a flexible hinge, so that the cover may be tightly bound in place over the container to hold the can or receptacle rigidly in position during shipment and which will insure the exclusion of air from the top of the container.

Another object of the invention is to provide an improved cover which may not only be adjusted so as to be tightly bound about the upper end of the container, but which may be sealed in place so as to prevent unauthorized access to the interior of the container without detection.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is an elevation of a shipping container constructed according to the present invention, parts of the same being broken away and shown in section, and an ice cream receptacle being shown in position therein.

Figure 2 is a reduced perspective view of the shipping container with the cover removed and swung into open position.

Figure 3 is a side elevation of the container closed and showing the seal for the cover.

Figure 4 is a similar view of the opposite side to Figure 3 and showing the hinge and adjustable binding means for the cover, and Figure 5 is a side elevation of the container in open position taken at right angles to Figure 4, and showing the cover swung down out of the way.

Figure 1:
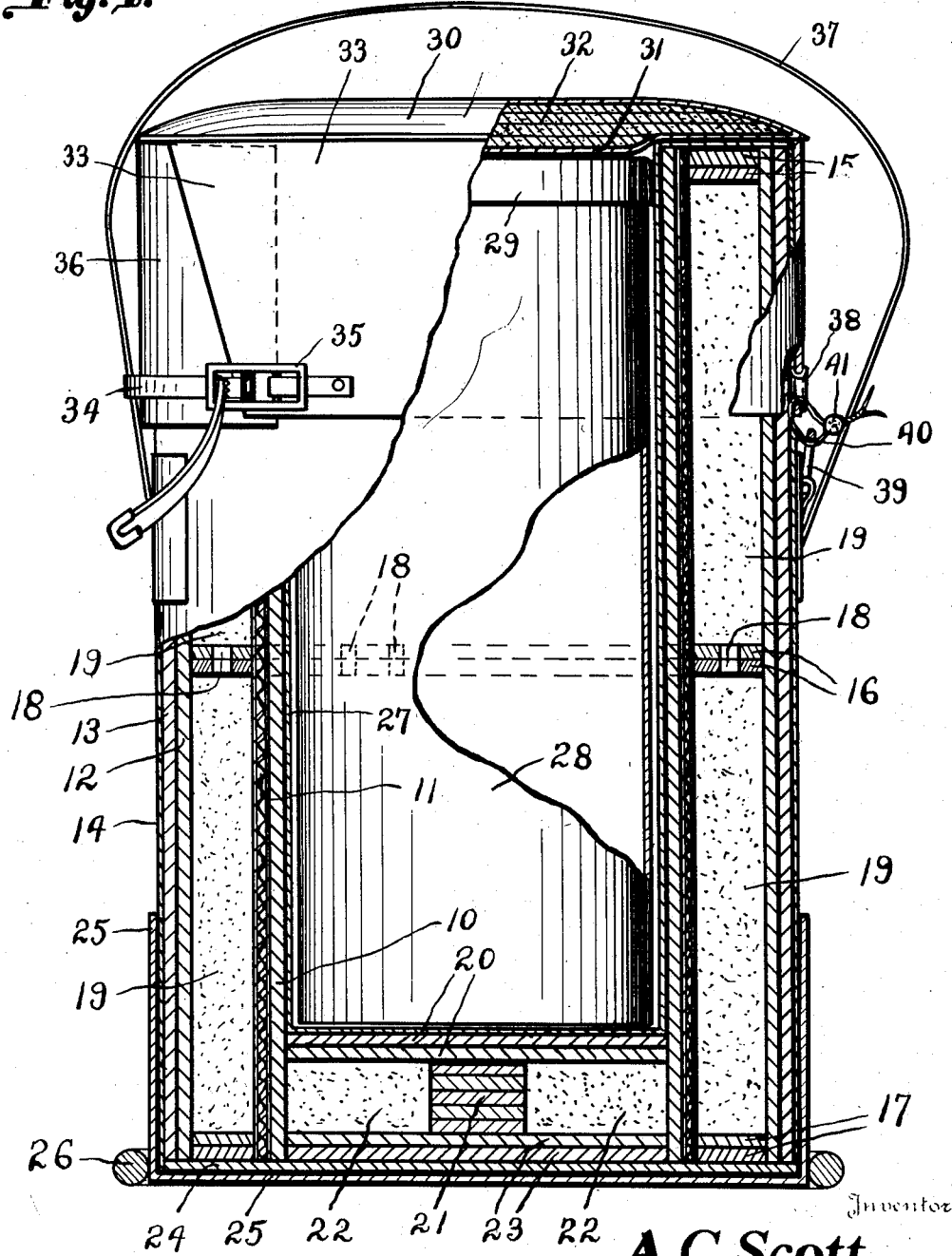

Referring to the drawings the container comprises a body portion made up of concentrically spaced walls. The inner wall is composed of a smooth layer of fiber 10 surrounded by a closely fitting layer 11 of corrugated fiber board providing dead air cells about the layer 10. The outer wall of the container is made up of adjacent smooth layers 12 and 13 of fiber board or the like preferably covered on the exterior with a layer of canvas 14 of suitable strength and forming the exterior cover of the container. The inner and outer walls of the container are spaced apart by three pairs of fiber rings 15, 16 and 17 arranged respectively at the top, the intermediate and the bottom portions of the container for reinforcing and strengthening the same and maintaining the walls in suitably spaced relation throughout the entire height of the container.

The intermediate rings 16 are provided with relatively large openings 18 therethrough which intercommunicate the upper and lower chambers between the inner and outer walls, and the chambers are preferably filled with a body of powdered cork 19 which is closely packed in the chambers to prevent free circulation of air and to insulate the walls one from the other. The powdered cork is adapted to settle through the openings 18 from one chamber to the other as the container is handled so that the denser portion of the cork filler 19 is at the bottom and intermediate parts of the container, and so that the lighter packed portion of the filler is at the top of the container where it is not desired to maintain such an effective seal, and so that the ingredients in the top of the container may melt more rapidly than the remainder of the bulk. The openings 18 prevent the formation of a loosely packed mass of the cork at the intermediate portion of the container which would otherwise destroy the continuous solid insulation and would result in the softening of the frozen material at an intermediate point instead of at the top. The inner wall provides a compartment or storage space and the latter is provided with a false bottom 20 comprising a pair of fiber discs superposed upon each other and supported by strips or blocks 21 of fiber which are in built up formation to the desired height and which are of small surface area to provide chambers or spaces thereabout and at opposite sides for a bottom filler 22 of finely divided cork.

The spacing block 21 is supported upon a pair of bottom discs 23, also of fiber and which support the filler 22, the discs 23 being mounted upon an enlarged bottom disc 24, which extends across the lower edges of both the inner and outer walls and forms the closure for the entire bottom of the container. The bottom and lower part of the container is protected by an exterior layer 25 of heavy canvas or the like, which not only extends beneath the container, but also up the exterior sides thereof for a suitable distance as shown. A buffing ring 26 of rope or the like is secured about the lower edge portion of the container to prevent damage to the same in rough handling, rolling and the like.

The inner compartment is provided with a lining 27 of canvas which is waxed or dipped in paraffin, the layer 27 extending across the false bottom 20 and also up the inner sides of the inner wall of the container. This forms the interior compartment which is adapted to receive a receptacle or can 28 adapted to contain ice cream or the like and which is provided with a removable cover 29 on its upper end in the usual manner.

The container is provided with a cover 30 which is in the form of a disc or cap adapted to seat over the entire top of the container and which is made up of an outer layer of canvas and an inner layer of canvas 31 between which are imposed layers of flax or wool 32 forming a heat non-conducting pad, the resiliency of the layers 32 forming a cushion adapted to force the inner layer of canvas 31 down into the compartment of the container and against the top 29 of the receptacle. The receptacle is thus held in rigid position by reason of this pad or packing at its top. The cap or closure 30 as formed, is provided with a flexible flange or skirt 33 which is stretched along the outer edge of the canvas layer, and which is adapted to extend down to an appreciable extent over the top of the container. The skirt 33 is interrupted at one side to provide an ample space for permitting the skirt to be contracted about the container and to accomplish this result the skirt 33 is provided at one side and near its lower edge with a strap 34 adapted to engage adjustably and detachably with a buckle 35 secured to the opposite lower edge portion of the skirt. The strap 34 is adapted to be drawn taut through the buckle in order to contract the skirt tightly about the upper edge of the container.

At this interrupted portion of the skirt 33 is located a flexible hinge strip 36 formed of leather or the like stretched at its upper end to the cap or closure 30 and which is preferably of greater width than the space between the separated edges of the skirt to extend therebetween and permit of the uninterrupted adjustment of the skirt. The binding of the skirt over the opposite edge portions of the hinge strip 36 also hold the latter flat against the container and bind the hinged strip against the container to form the interrupted portion of the skirt and thus effectively close and seal the cap upon the container. The lower edge portion of the strip 36 is stretched or otherwise suitably secured to the container along a line adjacent to the lower edge of the skirt so that the hinge strip in appearance forms substantially a continuation of the skirt.

The container may be provided with a flexible hand strap 37 which is preferably secured at one end beneath the hinge strap 36 to the outer side of the container and at its other end is preferably secured to the opposite side of the container, so that the strap may be drawn upwardly and arched over the removable top and may also be flexed or bent to one side out of the way of the cover when it is desired to open the same.

In order to prevent unauthorized tampering with the contents of the container during shipment, and without detection, the skirt 33 is provided at one side, preferably opposite to the hinged strap 36, with an eye piece 38 secured through the skirt and which is adapted to register with a ring or loop 39 secured to the adjacent side of the container, the eye piece 38 and the ring 39 being arranged to receive a sealing wire 40 therethrough, the ends of which are adapted to be secured beneath a suitably stamped seal 41 which may bear the particular marks of the shipper.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. A shipping container comprising a body portion, a cap fitting over the top of the body portion and including a heat non-conducting cushion adapted to be compressed against and into the upper end of the container, a flexible hinge strip connected at opposite ends to the container and to the cap, a flexible skirt depending from the cap about the container and overlapping said hinge strip, and means for drawing the skirt taut about the container and over the hinge strip.

2. A shipping container comprising a body portion, a cap fitting over the body portion and having a cushion in its top adapted to fit into the top of the container and provided with a depending skirt adapted to encircle the upper end of the container, an elongated hinge strap connecting the container to the cap, adjustable binding means carried by the skirt for drawing the same taut about the container and over said hinge strap, an eye piece secured through a portion of the skirt, a ring secured to the container adjacent to the eye piece, and a sealing wire adapted to be secured through said eye piece and said ring.

ALLEN C. SCOTT.